3,770,658
AMMONIA SYNTHESIS CATALYST

Atsumu Ozaki, Tokyo, Ken-Ichi Aika, Numazu, Akio Furuta, Yokohama, and Akio Okagami, Tokyo, Japan, assignors to Japan Gasoline Co., Ltd., Tokyo, Japan
No Drawing. Filed June 21, 1971, Ser. No. 155,222
Claims priority, application Japan, June 22, 1970, 45/54,511; May 22, 1971, 46/34,981, 46/34,982
Int. Cl. B01j 11/06, 11/40, 11/82
U.S. Cl. 252—443                                 8 Claims

ABSTRACT OF THE DISCLOSURE

In synthesizing ammonia through reaction between nitrogen and hydrogen, it is possible to effect said synthesis at a lower temperature by the use of a catalyst comprising at least one element selected from the group consisting of transition metals belonging to VI–B group, VII–B group and VIII group of Periodic Table and at least one element selected from the group consisting of alkali metals, both of said elements being substantially in metallic state, together with a promoter or a support in addition thereto as occasion demands.

BACKGROUND OF THE INVENTION (a) Field of the invention

The present invention relates to a method of synthesizing ammonia from nitrogen and hydrogen and to a catalyst suitable for use in said method.

(b) Description of the prior art

In synthesizing ammonia from nitrogen and hydrogen according to the prior art, it has been usual in practice to use an iron catalyst which comprises iron as the principal component and, as the promoter component, a difficultly reducible oxide such as alumina, thoria, zirconia, etc. and alkali and alkaline earth oxides such as potassium oxide, calcium oxide, etc. dispersed among the iron crystallites (for instance, a catalyst consisting of 94 wt. percent of Fe, 4 wt. percent of $Al_2O_3$, 1 wt. percent of CaO and 1 wt. percent of $K_2O$). However, a catalyst of this type does not always possess of a satisfactory efficiency in respect of its activity, so that it fails to display a sufficient activity at a low temperature, such as below 300° C., favorable for producing ammonia from the viewpoint of chemical equilibrium. Accordingly, the conventional industrial plants have been operated inevitably at a high temperature such as 400–450° C. in spite of disadvantages from the viewpoint of chemical equilibrium, and, for the purpose of making up for this shortcoming, a high pressure such as 300–500 kg./cm.$^2$ has been applied thereto. But, despite such a high pressure, the once-through conversion has been limited to about 20% on account of the disadvantages in respect of equilibrium at high temperature as well as the retardation by ammonia, thereby bringing about an enormous increase in the amount of recycle gas which entails an increase in operating costs such as expenses for motive power, heat transfer, recovery of ammonia, etc.

To cite another catalyst once employed in synthesizing ammonia industrially in addition to the foregoing one, there was a catalyst which substantially consisted of complex cyanate, but this catalyst simply failed to be an effective catalyst for use in synthesizing ammonia inasmuch as the activity thereof was not only greatly influenced by the purity of the feed gas, but also the activity was practically the same as that of the foregoing catalyst.

A principal object of the present invention is to provide a method of synthesizing ammonia which will ensure a reduction in the manufacturing cost of ammonia.

Another object of the present invention is to provide a method of synthesizing ammonia at a lower temperature.

A further object of the present invention is to provide a catalyst for use in synthesizing ammonia, which is suitable for the foregoing method.

A still further object of the present invention is to provide an ammonia synthesis catalyst, which shows but a slight lowering of reaction rate even in the presence of highly concentrated ammonia.

SUMMARY OF THE INVENTION

The present inventors have conducted a series of researches, experiments and reviews over a long period of time to develop an effective catalyst which constitutes the most important factor in reducing the manufacturing cost of ammonia from nitrogen and hydrogen and discovered quite a novel catalyst which demonstrates a high activity even at a lower temperature and, in case it comprises specific transition metal, shows but a slight lowering of the reaction rate even in the presence of highly concentrated ammonia. They have further found a method of synthesizing ammonia which enables said catalyst to manifest its effect more efficiently. Based on these findings, they accomplished the present invention.

The catalyst according to the present invention makes the best use of the unique effect of metallic state of alkali elements and is possessed of characteristics quite different from the conventional catalysts for use in synthesizing ammonia. In other words, in view of the fact that a transition metal element, when activated by an alkali metal of metallic state, comes to have a specific catalytic activity (per surface area) 10 times as high as that of said transition metal before such activation, the catalyst according to the present invention is characterized by the combination of the transition metal element and the alakli metal element.

To be precise, the catalyst under the present invention comprises at least one element selected from the group consisting of transition metals belonging to VI–B group, VII–B group and VIII group of the Periodic Table and at least one element selected from the group consisting of alkali metals belonging to I–A group of Periodic Table, both elements being substantially in metallic state.

In this connection, some of the conventional catalysts for use in synthesizing ammonia also comprises alkali, but such alkali is involved in the catalysts in the form of oxide such as potassium oxide and remains in that oxide form even in working state of the catalysts. The effect of such alkali oxide employed for the conventional catalysts is only achieved by collaboration with the other oxides such as alumina, silica and the like, as is clear in the light of the known fact that, when an alkali oxide alone is mixed with iron, the activity of the iron catalyst gets rather deteriorated [cf. J. A. Almquist, E. D. Crittenden, Ind. Eng. Chem., 18, 1307 (1926)], and is therefore essentially different from the effect of addition of metallic alkali as disclosed in the present invention.

The catalyst to be applied in the method of synthesizing ammonia according to the present invention comprises, as described above, a transition metal and an alkali metal and can well manifest a fairly high catalytic activity by combination of the two components, e.g., metallic iron and metallic potassium but, for the purpose of further improvement of its catalytic activity, such substances as activated carbon or porous carbon, difficultly reducible oxide, metal carbide, etc. can be applied as the third component. Accordingly, under the present invention are included the multi-component catalysts comprising at least one element selected from the group consisting of transition metals belonging to VI–B group, VII–B group and VIII group of Periodic Table, at least one element selected from the group consisting of alkali metals belonging to I–A group of the Periodic Table, and at least one third component selected from the group consisting of activated carbon, porous carbon, difficultly reducible oxide and metal carbide.

The transition metal suitable for use in the present catalyst includes, for instance, molybdenum (Mo), tungsten (W) and chromium (Cr) belonging to VI–B group, manganese (Mn), rhenium (Re) and uranium (U) belonging to VII–B group, and iron (Fe), cobalt (Co), nickel (Ni), ruthenium (Ru), rhodium (Rh) and osmium (Os) belonging to VIII group of the Periodic Table, among which Fe, Co, Re, Ru, Os, Mo or mixtures thereof are especially effective.

Although the content of the transition metal in the catalyst applicable in the present invention ranges from 0.3 to 99% (by weight), it is preferable to make a distinction between two groups of transition metals (A) and (B) as defined in the following.

(A) Those metals belonging to the second and third transition series in VII–B group and VIII group of Periodic Table.
(B) Other transition metals.

The preferable content of transition metal is in the range of 0.3–10% (by weight) for the group (A) and 5–99% (by weight) for the group (B). As to the alkali metal preferable in the present invention, the higher the atomic number of the element, the higher the activity thereof, but it is common to use potassium or sodium from the economical point of view.

The amount of alkali metal to be employed depends on the kind of the transition metal element and/or the kind of the third component, but it is desirable to make it be in the range of 0.1–50% (by weight). The suitable weight ratio of alkali metal to the transition metal in the catalyst are in the range of 0.3–100 for the group (A) and in the range of 0.01 to 3 for the group (B). More preferable ratios are in the range of 2–10 for group (A) and 0.01–0.1 or 1–3 for group (B).

The substance suitable for use as the third component of the present catalyst includes, for instance, activated carbon, alumina, silica, celite, diatomaceous earth, thoria, zirconia, silicon carbide, etc., among which activated carbon, alumina, silica, thoria and zirconia are especially effective. The amount of the third component to be employed is not necessarily specified and its effect is detectable even with a small amount of addition. But in some case which depends on the kind of the transition metal, it is more profitable to employ the third component in a large amount.

As to the methods of incorporating the alkali metal with the transition metal, the adsorption process of the alkali metal by means of vacuum evaporation or of carrying with an inert gas, the soaking process employing a liquid ammonia solution of the alkali metal or the alkali metal dispersion in hydrocarbon and the process of heating the prepared solid mixture of the transition metal and alkali metal at 200–300° C. under reduced pressure are all applicable. However, in view of the activity of the present catalyst and for the purpose of economical mass production, the soaking process from the liquid ammonia solution is suitable while, as the method of adding the alkali metal to the catalyst packed in a reactor, the adsorption process by means of carrying with an inert gas is suitable. The condition for the vacuum evaporation process varies with the kinds of alkali metals, but this process is usually effected at a temperature in the range of 300°–500° C. Application of a temperature higher than 500° C. is inadvisable as it accelerates crystallization of transition metals. The soaking process employing liquid ammonia comprises the steps of soaking the third component material impregnated with transition metal, e.g., the activated carbon impregnated with ruthenium, in a solution of liquid ammonia containing alkali metal and subsequently removing ammonia by evaporation to thereby make the alkali metal incorporate with said transition metal. This process can be performed under the atmospheric pressure or elevated pressure, and, in case of the atmospheric pressure, it is convenient to perform it at a temperature below $-34°$ C., the boiling point of liquid ammonia, while, in case of an elevated pressure, it is convenient to perform it at the room temperature. As to the concentration of the alkali metal solution, although said solution may contain the alkali metal up to the saturation, the loss of alkali metal increases as the concentration goes up, and consequently suitable concentration is usually in the range of 1–10% (by weight).

The catalyst under the present invention can be easily prepared through such processes as described above, and, by the use of this catalyst, a highly concentrated ammonia can be synthesized at a lower temperature.

It goes without saying that application of low reaction temperature and high reaction pressure is thermodynamically desirable, but, as the operation condition in case of employing the present catalyst, a reaction temperature in the range of 150°–450° C. and a reaction pressure (absolute pressure) in the range of 1–1000 kg./cm.$^2$ can be applied, while a reaction temperature in the range of 250°–450° C. and a reaction pressure in the range of 50–300 kg./cm.$^2$ is preferable.

The feed rate of the reactant gas applicable in the method of the present invention is in the range of 2000 hr.$^{-1}$– 100,000 hr.$^{-1}$–preferably in the range of 5000 hr.$^{-1}$– 30,000 hr.$^{-1}$.

The molar ratio of hydrogen to nitrogen may be set up in the range of 0.1–4, and, in case of ruthenium in particular, lowering of the ratio of hydrogen brings about increase in the rate of ammonia production to thereby raise the once-through conversion of hydrogen.

By the use of the catalyst according to the present invention, for instance, a catalyst consisting of ruthenium, activated carbon and potassium, it is possible to obtain 20% (by volume) ammonia at the outlet of reactor at the conditions of 350° C., 100 kg./cm.$^2$ and the molar ratio of hydrogen to nitrogen of 1:1. When a catalyst under the present invention consisting of iron, alumina and potassium is used, it is possible to obtain 18% (by volume) ammonia at the outlet of reactor at the conditions of 400° C., 100 kg./cm.$^2$ and the molar ratio of hydrogen to nitrogen of 3:1. This attests to the tremendous industrial value of the catalyst under the present invention in the light of the fact that the conventional iron catalyst for use in synthesizing ammonia, which contains potassium oxide, calcium oxide, alumina, etc., can produce about 10% (by volume) ammonia at most under almost the same conditions of temperature and pressure as above. What is particularly noteworthy with respect to the present invention is that the effect of pressure on the rate of ammonia production varies with the kinds of transition metals employed; the ruthenium catalyst under the present invention shows a superior activity under relatively low pressure as compared with the iron catalyst under the present invention, while the rate of ammonia production on this iron catalyst is increased with elevation of the pressure and finally comes to show an activity superior to the ruthenium catalyst.

As is clear from the foregoing, the catalyst according to the present invention is possessed of such a high activity as cannot be expected from the conventional catalysts, and is particularly characterized by its high activity at a lower temperature. However, it is necessary to make a good choice of operation conditions in order to make it display the optimum activity thereof.

As to the purity of reactant gas the conventional ammonia synthesis gas may be used without any particular purification, and, not only that, it is less susceptible to catalyst poisons such as carbon monoxide, oxygen, etc. than the conventional catalysts.

Given in the following are examples embodying the present invention, which will be a help in further elucidating the present invention.

DESCRIPTION OF THE PREFERRED EMBODIMENTS

In Examples 1–10, 13–15 and Comparative Examples 1, 2 and 4 among those examples given hereunder, reaction was effected by employing a reaction tube, 3 mm. in bore, of stainless steel, heated from the outside at prescribed temperature and introducing into said tube the synthesis gas consisting of hydrogen and nitrogen with the molar ratio of 3:1 at the rate of 5 l./hr. unless otherwise specified, and the amount of ammonia contained in the resulting gas was measured by titration.

In Examples 11–12 and Comparative Example 3, reaction was effected by the catalyst placed in a glass tube of 18 mm. in bore under one atmosphere at a flow rate of 5 l./hr. using the synthesis gas consisting of hydrogen and nitrogen with the molar ratio of 3:1, and the amount of ammonia contained in the resulting gas was measured by condensation with liquid nitrogen trap.

Example 1

By the use of various catalysts prepared by thorough reduction of either chloride or oxide of transition metals at 30°–600° C. followed by incorporation of metallic potassium to the extent of 2% (by weight) of said transition metals by means of vacuum evaporation at 400° C., ammonia was synthesized at 400° C. under the pressure of 30 kg./cm.$^2$. The results of the syntheses thus effected were as shown in Table 1.

TABLE 1

| No. | Transition metal | Starting material | Reduction temperature (° C.) | Amount of ammonia produced [ml. (STP)/hr.] |
|---|---|---|---|---|
| 1 | Iron | Ferric oxide | 300 | 125 |
| 2 | do | Magnetite | 350 | 100 |
| 3 | Cobalt | Cobalt oxide | 300 | 24 |
| 4 | Ruthenium | Ruthenium chloride | 300 | 180 |
| 5 | Rhenium | Rhenium chloride | 350 | 45 |
| 6 | Molybdenum | Molybdenum chloride | 500 | 10 |
| 7 | Tungsten | Tungsten oxide | 600 | 5 |
| 8 | Osmium | Osmium chloride | 300 | 90 |
| 9 | Iron-ruthenium | Ferric oxide, ruthenium chloride | 300 | 150 |
| 10 | Ruthenium-rhenium | Ruthenium chloride, rhenium chloride | 350 | 113 |
| 11 | Iron-molybdenum | Ferric oxide, molybdenum oxide | 500 | 16 |

The specific surface area of iron catalyst used in the run No. 1 of the above table as measured by B.E.T. method was 0.7 m.$^2$/g., and the activity per unit surface area was 180 ml. (STP)/hr.·cat.

Example 2

By the use of various catalysts prepared by thorough reduction of either chloride or oxide of transition metals at 300°–600° C. followed by incorporation of metallic sodium to the extent of 2% (by weight) of said transition metals by means of vacuum evaporation at 450° C., ammonia was synthesized at 400° C. under the pressure of 30 kg./cm.$^2$. The results of the syntheses thus effected were as shown in Table 2.

TABLE 2

| No. | Transition metal | Starting material | Reduction temperature (° C.) | Amount of ammonia produced [ml. (STP)/hr.] |
|---|---|---|---|---|
| 1 | Iron | Ferric oxide | 300 | 70 |
| 2 | do | Triiron tetroxide | 350 | 63 |
| 3 | Cobalt | Cobalt oxide | 300 | 10 |
| 4 | Ruthenium | Ruthenium chloride | 300 | 80 |
| 5 | Rhenium | Rhenium chloride | 350 | 21 |
| 6 | Molybdenum | Molybdenum oxide | 500 | 7 |
| 7 | Tungsten | Tungsten oxide | 600 | 3 |
| 8 | Osmium | Osmium chloride | 300 | 50 |
| 9 | Iron-ruthenium | Ferric oxide, ruthenium chloride | 300 | 84 |
| 10 | Ruthenium-rhenium | Ruthenium chloride, rhenium chloride | 350 | 45 |
| 11 | Iron-molybdenum | Ferric oxide, molybdenum oxide | 500 | 8 |

Example 3

By the use of various catalysts prepared by adding a prescribed amount of hardly reducible oxide as the third component to either chloride or oxide of transition metals, followed by thorough reduction at 300°–600° C. and subsequent incorporation of potassium to the extent of 2% (by weight) of said transition metals by means of vacuum evaporation at 400° C., ammonia was synthesized at 400° C. under the pressure of 30 kg./cm.$^2$. The results of the syntheses thus effected were as shown in Table 3.

TABLE 3

| Number | Transition metal | Third component | Content of third component (percent) | Amount of ammonia produced [ml.(STP)/hr.] |
|---|---|---|---|---|
| 1 | Iron | Alumina | 2 | 411 |
| 2 | do | Thoria | 2 | 300 |
| 3 | do | Zirconia | 2 | 358 |
| 4 | do | Silica | 2 | 285 |
| 5 | Cobalt | Alumina | 2 | 50 |
| 6 | Nickel | do | 2 | 7.5 |
| 7 | Ruthenium | do | 10 | 348 |
| 8 | do | Thoria | 5 | 320 |
| 9 | Rhenium | Alumina | 2 | 45 |
| 10 | Molybdenum | do | 2 | 20 |
| 11 | Tungsten | do | 2 | 15 |
| 12 | Osmium | do | 10 | 170 |
| 13 | Iron-ruthenium | do | 2 | 375 |
| 14 | Ruthenium-rhenium | do | 2 | 60 |
| 15 | Iron-molybdenum | do | 2 | 3 |

Example 4

By the use of various catalysts prepared by adding a prescribed amount of hardly reducible oxide as the third component to either chloride or oxide of transition metals, followed by thorough reduction of the mixtures at 300°–600° C. and subsequent incorporation of sodium to the extent of 2% (by weight) of said transition metals by means of vacuum evaporation at 400° C., ammonia was synthesized at 400° C. under the pressure of 30 kg./cm.$^2$. The results of the syntheses thus effected were as shown in Table 4.

TABLE 4

| Number | Transition metal | Third component | Content of third component (percent) | Amount of ammonia produced [ml.(STP)/hr.] |
|---|---|---|---|---|
| 1 | Iron | Alumina | 2 | 250 |
| 2 | do | Thoria | 2 | 210 |
| 3 | do | Zirconia | 2 | 223 |
| 4 | do | Silica | 2 | 201 |
| 5 | Cobalt | Alumina | 2 | 30 |
| 6 | Ruthenium | do | 10 | 170 |
| 7 | do | Thoria | 5 | 155 |
| 8 | Rhenium | Alumina | 2 | 40 |
| 9 | Molybdenum | do | 2 | 15 |
| 10 | Tungsten | do | 2 | 8 |
| 11 | Osmium | do | 10 | 88 |
| 12 | Iron-ruthenium | do | 2 | 203 |
| 13 | Ruthenium-rhenium | do | 2 | 46 |
| 14 | Iron-molybdenum | do | 2 | 24 |

Example 5

By the use of various catalysts prepared by the same process as in Example 1 except that the incorporation of potassium with transition metals was made by the soaking process employing a 10% (by weight) liquid ammonia solution of potassium, ammonia was synthesized at 400° C. under the pressure of 30 kg./cm.$^2$. The results of the syntheses thus effected were as shown in Table 5.

TABLE 5

| Number | Transition metal | Amount of ammonia produced [ml. (STP)/hr.] |
|---|---|---|
| 1 | Iron | 150 |
| 2 | Ruthenium | 220 |
| 3 | Rhenium | 55 |
| 4 | Molybdenum | 13 |
| 5 | Tungsten | 5 |
| 6 | Osmium | 110 |

Example 6

By the use of various catalysts prepared by the same process as in Example 2 except that the incorporation of sodium wtih transition metals was made by the soaking process employing a 10% (by weight) liquid ammonia solution of sodium, ammonia was synthesized at 400° C. under the pressure of 30 kg./cm.$^2$. The results of syntheses thus effected were as shown in Table 6.

TABLE 6

| Number | Transition metal | Amount of ammonia produced [ml. (STP)/hr.] |
|---|---|---|
| 1 | Iron | 70 |
| 2 | Ruthenium | 100 |
| 3 | Rhenium | 30 |
| 4 | Molybdenum | 15 |
| 5 | Tungsten | 3 |
| 6 | Osmium | 55 |

Example 7

By the use of various catalysts prepared by the same process as in Example 6 except that 1:1 (by weight) mixture of potassium and sodium was incorporated with transition metals by the soaking process employing liquid ammonia containing 5% (by weight) of metallic potassium and 5% (by weight) of metallic sodium, ammonia was synthesized at 400° C. under the pressure of 30 kg./cm.$^2$. The results of the syntheses thus effected were as shown in Table 7.

TABLE 7

| Number | Transition metal | Amount of ammonia produced [ml. (STP)/hr.] |
|---|---|---|
| 1 | Iron | 130 |
| 2 | Ruthenium | 156 |
| 3 | Rhenium | 32 |
| 4 | Molybdenum | 13 |
| 5 | Tungsten | 5 |
| 6 | Osmium | 70 |

Example 8

By the use of various catalysts prepared by the same process as in Example 3 except that potassium was incorporated with transition metals by the soaking process employing a 10% (by weight) liquid ammonia solution of potassium, ammonia was synthesized at 400° C. under the pressure of 30 kg./cm.$^2$. The results of syntheses thus effected were as shown in Table 8.

TABLE 8

| Number | Transition metal | Third component | Content of third component (percent) | Amount of ammonia produced [ml.(STP)/hr.] |
|---|---|---|---|---|
| 1 | Iron | Alumina | 2 | 450 |
| 2 | do | Thoria | 2 | 380 |
| 3 | Cobalt | Alumina | 2 | 50 |
| 4 | Ruthenium | do | 10 | 395 |
| 5 | do | Thoria | 5 | 328 |
| 6 | Rhenium | Alumina | 2 | 56 |
| 7 | Molybdenum | do | 2 | 23 |
| 8 | Tungsten | do | 2 | 15 |
| 9 | Osmium | do | 10 | 191 |

Example 9

By the use of various catalysts prepared by the same process as in Example 4 except that sodium was incorporated with transition metals by the soaking process employing a 10% (by weight) liquid ammonia solution of sodium, ammonia was synthesized at 400° C. under the pressure of 30 kg./cm.$^2$. The results of the syntheses thus effected were as shown in Table 9.

TABLE 9

| Number | Transition metal | Third component | Content of third component (percent) | Amount of ammonia produced [ml.(STP)/hr.] |
|---|---|---|---|---|
| 1 | Iron | Alumina | 2 | 270 |
| 2 | do | Thoria | 2 | 230 |
| 3 | Cobalt | Alumina | 2 | 35 |
| 4 | Ruthenium | do | 10 | 178 |
| 5 | do | Thoria | 5 | 162 |
| 6 | Rhenium | Alumina | 2 | 45 |
| 7 | Molybdenum | do | 2 | 18 |
| 8 | Tungsten | do | 2 | 8 |
| 9 | Osmium | do | 10 | 101 |

Example 10

By the use of various catalysts prepared by the same process as in Example 9 except that 1:1 (by weight) mixture of potassium and sodium was incorporated with transition metals by the soaking process employing liquid ammonia containing 5% (by weight) of metallic potassium and 5% (by weight) of metallic sodium, ammonia was synthesized at 400° C. under the pressure of 30 kg./cm.$^2$. The results of the syntheses thus effected were as shown in Table 10.

TABLE 10

| Number | Transition metal | Third component | Content of third component (percent) | Amount of ammonia produced [ml.(STP)/hr.] |
|---|---|---|---|---|
| 1 | Iron | Alumina | 2 | 330 |
| 2 | do | Thoria | 2 | 294 |
| 3 | Cobalt | Alumina | 2 | 48 |
| 4 | Ruthenium | do | 10 | 210 |
| 5 | do | Thoria | 5 | 178 |
| 6 | Rhenium | Alumina | 2 | 48 |
| 7 | Molybdenum | do | 2 | 18 |
| 8 | Tungsten | do | 2 | 10 |
| 9 | Osmium | do | 10 | 141 |

Example 11

By the use of various catalysts prepared by the impregnation of activated carbon with transition metals to the extent of 10% (by weight) of said activated carbon followed by hydrogen reduction at 350°–400° C. and subsequent incorporation of potassium to the extent of 35% (by weight) of said activated carbon by means of vacuum evaporation at 400° C., ammonia was synthesized under atmospheric pressure at various temperatures. The results of the syntheses thus effected were as shown in Table 11.

TABLE 11

| | Transition metal | Reaction temperature (° C.) | Amount of ammonia produced [ml. (STP)/hr.] |
|---|---|---|---|
| Number: | | | |
| 1 | Iron | 250 | 1.40 |
| 2 | do | 200 | 0.40 |
| 3 | Cobalt | 275 | 2.4 |
| 4 | do | 235 | 0.33 |
| 5 | Nickel | 310 | 0.86 |
| 6 | Ruthenium | 165 | 0.60 |
| 7 | do | 200 | 4.0 |
| 8 | Osmium | 240 | 0.59 |
| 9 | Rhenium | 239 | 0.51 |
| 10 | Molybdenum | 254 | 1.7 |

Example 12

By the use of various catalysts prepared by the same process as in Example 11 except for substituting sodium for potassium, ammonia was synthesized under atmospheric pressure at various temperatures. The results of the syntheses thus effected were as shown in Table 12.

TABLE 12

| | Transition metal | Reaction temperature (° C.) | Amount of ammonia produced [ml. (STP)/hr.] |
|---|---|---|---|
| Number: | | | |
| 1 | Cobalt | 275 | 0.25 |
| 2 | Ruthenium | 200 | 0.40 |

Example 13

By the use of a catalyst obtained by impregnation of activated carbon with ruthenium to the extent of 10% (by weight) of said activated carbon followed by hydrogen reduction at 350° C. and subsequent incorporation of potassium to the extent of 20% (by weight) of said activated carbon by the soaking process employing 5% (by weight) liquid ammonia solution of potassium, ammonia was synthesized at 375° C. under the pressure of 100 kg./cm.$^2$. The amount of ammonia thus produced was 1000 ml. (STP)/hr.

Example 14

By the use of the same catalyst as in Example 13, ammonia was synthesized employing a synthesis gas consisting of hydrogen and nitrogen with a molar ratio of 1:1 at 350° C. under the pressure of 100 kg./cm.$^2$. The amount of ammonia thus produced was 1000 ml. (STP)/hr.

Example 15

By the use of an iron catalyst containing 2% (by weight) alumina to which potassium was incorporated to the extent of 2% (by weight) by means of vacuum evaporation at 400° C., ammonia was synthesized at 400° C. under the pressure of 100 kg./cm.$^2$. The amount of ammonia thus produced was 900 ml. (STP)/hr. When this synthesis was made at 300° C. under the pressure of 100 kg./cm.$^2$, the amount of ammonia produced was 360 ml. (STP)/hr.

Comparative Example 1

By the use of various catalysts prepared by reduction of either chloride or oxide of transition metals at 300°–600° C. and without adding any alkali metal, ammonia was synthesized at 400° C. under the pressure of 30 kg./cm.$^2$. The results of the syntheses thus effected were as shown in Table 13.

TABLE 13

| Number | Transition metal | Amount of ammonia produced [ml. (STP)/hr.] |
|---|---|---|
| 1 | Iron | 35 |
| 2 | Cobalt | (¹) |
| 3 | Ruthenium | 15 |
| 4 | Rhenium | 8 |
| 5 | Molybdenum | 5 |
| 6 | Tungsten | (¹) |
| 7 | Osmium | 15 |

¹ Very small.

The specific surface area of iron used in the run No. 1 of the above table as measured by B.E.T. method was 2 m.²/g., and the activity per unit surface area was 17.5 ml. (STP)hr.·m.²·cat.

Comparative Example 2

By the use of various catalysts prepared by adding a prescribed amount of hardly reducible oxide as the third component to either chloride or oxide of transition metal, followed by thorough reduction of the mixtures at 300°–600° C. under without adding any alkali metal thereto, ammonia was synthesized at 400° C. under the pressure of 30 kg./cm.². The results of the syntheses thus effected were as shown in Table 14.

TABLE 14

| Number | Transition metal | Third component | Content of third component (percent) | Amount of ammonia produced [ml.(STP)/hr.] |
|---|---|---|---|---|
| 1 | Iron | Alumina | 2 | 90 |
| 2 | do | Thoria | 2 | 165 |
| 3 | do | Zirconia | 2 | 153 |
| 4 | do | Silica | 2 | 110 |
| 5 | Cobalt | Alumina | 2 | (¹) |
| 6 | Nickel | do | 2 | (¹) |
| 7 | Ruthenium | do | 10 | 7 |
| 8 | do | Thoria | 5 | 4 |
| 9 | Rhenium | Alumina | 2 | (¹) |
| 10 | Molybdenum | do | 2 | (¹) |
| 11 | Tungsten | do | 2 | (¹) |
| 12 | Osmium | do | 10 | 15 |

¹ Very small.

Comparative Example 3

A catalyst prepared by impregnation of activated carbon with transition metal to the extent of 10% (by weight) of said activated carbon and without adding any alkali metal thereto was subjected to hydrogen reduction at 400° C. prior to application. When this catalyst was measured for its ammonia synthesizing activity under atmospheric pressure, no synthesis of ammonia was observed at the reaction temperature range of 350°–400° C. over any transition metal shown in the foregoing Example 11.

Comparative Example 4

When a conventional iron catalyst for industrial use containing potassium oxide, calcium oxide, and alumina, was thoroughly reduced at 450° C. and thereafter tested for its activity at 400° C. under the pressure of 100 kg./cm.², the amount of ammonia synthesized thereby was 550 ml. (STP)/hr. In case of the temperature being 300° C. and the pressure being 100 kg./cm.², said amount was 100 ml. (STP)/hr.

What is claimed is:

1. An ammonia synthesis catalyst composition, consisting essentially of,
   (A) from 0.3 to 99% by weight of at least one member selected from the group consisting of transition metals of Group VI–B, Group VIII–B and Group VIII of the Periodic Table, in the metallic state, and
   (B) from 0.1 to 50% by weight of at least one member selected from the group consisting of alkali metals of Group I–A of the Periodic Table, in the metallic state, and
   (C) the balance is at least one material selected from the group consisting of activated carbon, alumina, silica, celite, diatomaceous earth, thoria, zirconia and silicon carbide.

2. An ammonia synthesis catalyst composition as claimed in claim 1, in which the constituent (A) is at least one member selected from the group consisting of molybdenum, iron, and cobalt.

3. An ammonia synthesis catalyst composition as claimed in claim 1, in which the constituent (A) is at least one member selected from the group consisting of rhenium, ruthenium, and osmium.

4. An ammonia synthesis catalyst composition as claimed in claim 1, in which constituent (C) is impregnated with constituent (A) and constituent (B) is deposited thereon.

5. An ammonia synthesis catalyst composition as claimed in claim 1, in which constituent (A) is from 0.3 to 10% by weight of at least one member selected from the group consisting of transition metals of the second and third transition series of Group VII–B and Group VIII, and constituent (B) is present in an amount from 0.3 to 100 times the weight of constituent (A).

6. An ammonia synthesis catalyst composition as claimed in claim 1, in which constituent (A) is from 5 to 99% by weight of at least one member selected from the group consisting of transition metals of Group VI–B, Group VII–B and Group VIII, excluding the transition metals of the second and third transition series in Group VII–B and Group VIII, and constituent (B) is present in an amount from 0.01 to 3 times the weight of constituent (A).

7. An ammonia synthesis catalyst composition as claimed in claim 1, in which constituent (A) is selected from the group consisting of iron, ruthenium and mixtures thereof.

8. An ammonia synthesis catalyst composition consisting essentially of
   (A) from 0.3 to 99% by weight of catalyst metal selected from the group consisting of iron, ruthenium and mixtures thereof, in the metallic state, and
   (B) the balance is at least one member selected from the group consisting of alkali metals of Group I–A of the Periodic Table, in the metallic state.

References Cited

UNITED STATES PATENTS

| 1,094,194 | 4/1914 | Bosch et al. | 252—474 X |
| 3,472,794 | 10/1969 | Carter et al. | 252—459 |
| 3,383,378 | 5/1968 | Bloch et al. | 252—476 X |
| 3,591,656 | 7/1971 | Kroll | 23—199 X |
| 3,446,589 | 5/1969 | Bottom et al. | 252—476 X |
| 2,994,727 | 8/1961 | Appell et al. | 252—476 X |

CARL F. DEES, Primary Examiner

U.S. Cl. X.R.

252—447, 454, 455 R, 463, 467, 471, 474, 476; 423—363